United States Patent [19]
Hunnicutt et al.

[11] Patent Number: 5,889,952
[45] Date of Patent: Mar. 30, 1999

[54] ACCESS CHECK SYSTEM UTILIZING CACHED ACCESS PERMISSIONS

[75] Inventors: Heath Hunnicutt; John F. Ludeman, both of Redmond, Wash.

[73] Assignee: Microsoft Corporation, Redmond, Wash.

[21] Appl. No.: 689,838

[22] Filed: Aug. 14, 1996

[51] Int. Cl.⁶ ................................................... G06F 17/00
[52] U.S. Cl. ...................................................... 395/200.49
[58] Field of Search ........................ 395/200.49, 200.55, 395/200.57, 200.59, 186, 187.01

[56] References Cited

U.S. PATENT DOCUMENTS

| | | | |
|---|---|---|---|
| 5,335,346 | 8/1994 | Fabbio | 395/600 |
| 5,560,008 | 9/1996 | Johnson et al. | 395/650 |
| 5,577,209 | 11/1996 | Boyle et al. | 395/200.06 |

*Primary Examiner*—Ellis B. Ramirez
*Attorney, Agent, or Firm*—Duft, Graziano & Forest, P.C.

[57] ABSTRACT

An access-check system for a network server comprises an access-cache for storing access-permissions generated by the server in response to resource access requests. The system retrieves the appropriate access-permission from the access-cache in response to receipt of a request necessitating the same access-permission as already generated for an earlier processed request. A user-token cache is also employed to assign a unique user-token, to be used in the access-cache, to each user logged on to the server. Changes made to the user-token cache are reflected in the access-cache by removing from the access-cache those entries containing the changed user-token. Changes made to an access control list are reflected in the access-cache by removing from the access-cache those entries containing the server resource with which the changed access control list is associated.

24 Claims, 4 Drawing Sheets

| USER-TOKEN | PERMITTED-ACCESS |
|---|---|
| TOKEN 1 | FULL CONTROL |
| TOKEN 2 | READ, WRITE |
| TOKEN 3 | READ |
| FILE CONTENT | |

FIG. 4

| FILE NAME | USER TOKEN |
|---|---|
| 300 | TOKEN3 |
| 301 | TOKEN3 |
| 300 | TOKEN1 |
| 302 | TOKEN3 |
| 301 | TOKEN1 |

ACCESS CHECK SYSTEM UTILIZING CACHED ACCESS PERMISSIONS

FIELD OF THE INVENTION

The invention relates to the control of access by users to resources available on a server. In particular, the invention relates to a caching mechanism for more efficiently performing an access check in response to a current resource request that is similar to a previous request.

STATEMENT OF THE PROBLEM

In a computer network it is often desirable to control access by users to resources available on the network. A user requesting a resource on a server may be local to the server or may be communicating over a network with the server. A network includes local-area networks, intranet networks, and the internet as well as any other networked computing environment. Requesting users might log on to the server with a unique user name and password or they might be 'anonymous' to the server. Anonymous users typically have limited access to the server's resources. The occurrence of anonymous users is particularly prevalent in the case of networks such as the internet where any public user with internet access can access a given server.

Access control lists are used to define the extent to which different users will be allowed access to different resources on a server. An access control list contains information which allows the operating system of a server to determine if a particular user has been granted access rights for a particular resource requested by the user. Each restricted resource has associated with it an access control list which lists the users granted access to the resource. Depending on the level of access control implemented on a given server, access control lists might be associated with disks, with files, or with other storage volumes. In an operating system where access control lists are associated with disks, an access control list for a given disk defines the access restrictions for all the resources or files stored on that disk. In an operating system where access control lists are associated with files, access by users is separately controlled for each file.

The flexibility and system performance offered by file-level access control is significant. However, the number of access checks performed by such a system is increased dramatically as compared to a system where access control is maintained only at the disk level. As with all operations of an operating system, performing an access check in response to a user request for a resource requires processing time of the central processing unit ("CPU time"). When a server is handling a large number of file requests a significant amount of CPU time can be consumed by performing the necessary access checks. In a system employing file-level access control lists, the access control list is part of each individual file-object. When a request for a given file-object is received, the operating system identifies the requesting user, opens the requested file-object, reads the access control list to determine if the user has the necessary access rights, and then delivers the file-object to the requesting user if the user has the necessary access privileges. Therefore it is necessary to open a requested file-object to perform the access check each time a file is requested.

The file-open operation consumes a great deal of CPU time. In a server receiving frequent file requests, the need to open every requested file-object to check the access control list is very expensive in terms of CPU time.

There exists a need for an access check system that is more efficient in its use of CPU time. Specifically, there exists a need for an access check system that performs the necessary access check, even at the file-level of access control, without the relatively slow operation of opening the requested file-object to check the associated access control list.

STATEMENT OF THE SOLUTION

The above described problems and others are solved and an advance in the art is achieved by the access check system of the present invention. The methods of the present invention provide an access-permission caching system for storing the last most recently generated access-permissions. If a request arrives at the server that is similar, in terms of the requesting user and the requested resource, to a previously processed request, then the system of the present invention locates the previously generated access-permission in the access-cache. The requesting users access-permission is therefore determined without opening the requested resource to read the associated access control list. This capability is a significant savings of processing time when repetitive resource-requests arrive, such as internet requests for a file. An access check performed according to the methods of the present invention is easily made about 15% faster than an access check according to existing systems.

When a user "logs-on" to an operating system, the user supplies a user-name and password. If the operating system recognizes the user then a unique user-token is generated by the system and the user-token is added to a user-token cache. At subsequent log-ons by the same user, the system returns the same user-token from the user-token cache. Then, if the user has requested a resource, the system checks the access-cache to see if the requested resource has already been accessed by the requesting user. If the requested resource has already been accessed by the requesting user then access to the resource is again provided by the system.

The access-cache contains access-permissions. Each access-permission relates to a previously processed resource request and contains the name of the requested resource and the user-name of the user that requested the resource. In an embodiment of the present invention, the access-cache contains an access-permission for each instance of a resource that has been accessed. In a further embodiment of the present invention the access-cache contains an access-permission for only the most-recent instance that a resource has been accessed. If the access-cache does not contain an access-permission containing the appropriate user-token and file-name, then a full access check is performed as described above with respect to existing access check systems. If upon performing the full access check it is determined that the requesting user has permission to access the requested resource, the system combines the name of the requested resource with the user-token of the requesting user into an access-permission and stores the access-permission in the access-cache. When this resource is specified in subsequent requests by the same user, the system will locate the relevant matching access-permission in the access-cache and return the matching access-permission to the server thereby indicating a positive result for the access check. The server then makes available to the user the requested resource.

When a user-token is removed from the user-token cache, the access-cache is scanned for all access-permissions containing the subject user-token and all occurrences are removed from the access cache. When a resource is changed, all access-permissions in the access-cache associated with the subject resource are removed from the access-cache.

An area of significant advantage for the present invention is handling file requests from anonymous users. In an internet server application, for example, the vast majority of file-object requests are from anonymous users. According to the present invention, all anonymous users share the same user-token and as a result the number of full, file-open access checks performed is dramatically reduced. The system of the present invention can also be configured to utilize filters to group together users having similar access privileges thereby reducing the number of file-open access checks. Operation of the system of the present invention reduces the frequency of the file-open operation thereby reducing the CPU time necessary to perform access checks. The operating system is therefore able to run more efficiently and quickly.

DETAILED DESCRIPTION

Figure 1:
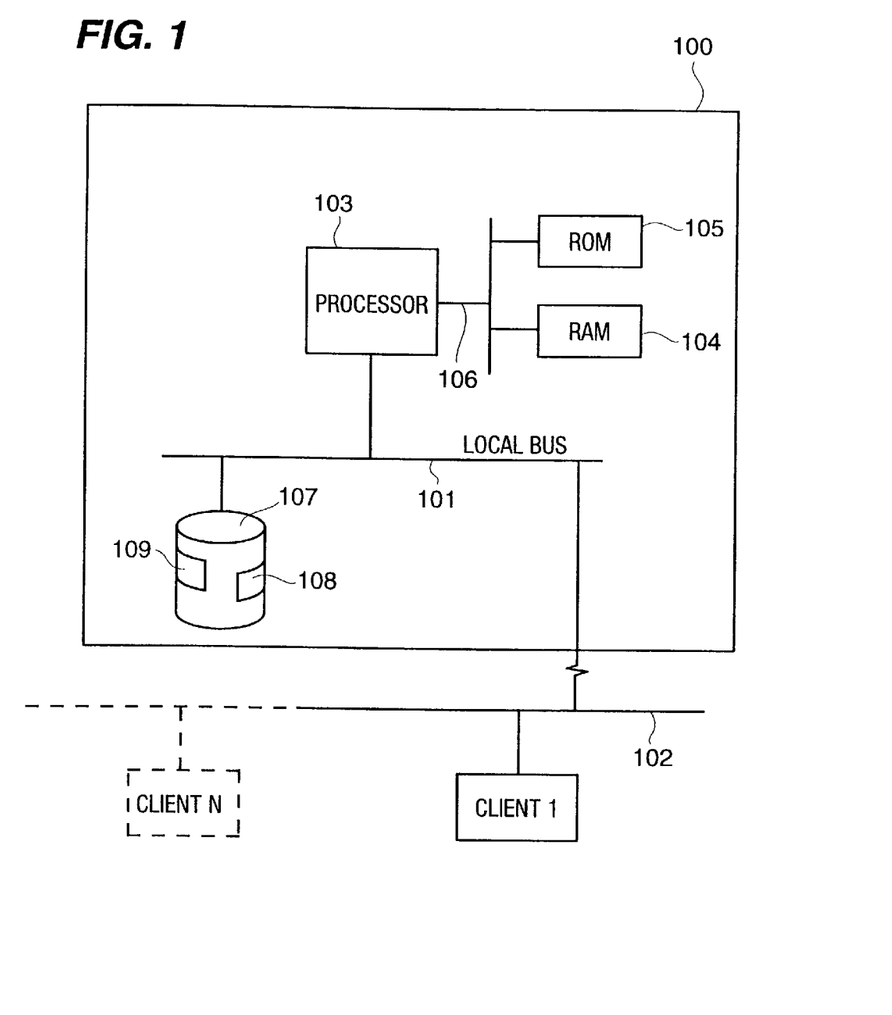
FIG. 1 illustrates a network-computing environment in block diagram form.

General Network Computing Environment—FIG. 1

FIG. 1 illustrates a block diagram of server 100 connected over local bus 101 to network 102. Network 102 may be a local-area network or any other network where multiple users are able to access resources on a single server, such as the internet. Connected to network 102 are clients 1–N. Client N represents any number of additional clients connected to the network. Server 100 communicates with other servers (not shown) and clients 1–N using a standard communications protocol. Programmed instructions for the access check system of the present invention are executable on processor 103. Processor 103 stores and/or retrieves the programmed instructions and/or data from memory devices that include, but are not limited to, Random Access Memory (RAM) 104 and Read Only Memory (ROM) 105 by way of memory bus 106. Another accessible memory device includes non-volatile memory device 107 by way of local bus 101. Programmed instructions for implementing the access check system of the present invention are stored on non-volatile memory device 107 as part of system application 108. Also stored on non-volatile memory 107 is file storage volume 109 containing various files as discussed below. The access check system of the present invention is operable in any of several standard computing operating systems readily available in the industry.

Figure 2:
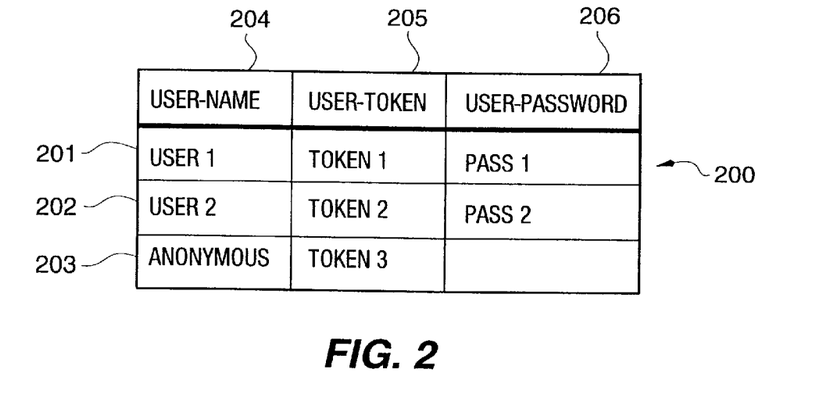
FIG. 2 depicts a user-token cache memory location according to the present invention.

Assignment of User-Tokens—FIG. 2

A multiplicity of users (not shown) may connect to server 100 through each of clients 1–N. The process by which a user connects to server 100 is called "logging on". When a user logs on to server 100, the user supplies a user-name and a password to server 100. If the user-name and password supplied by the user are recognized by server 100 then the user is allowed to log on, or connect, to server 100. In a system where access-permission is required for a user to access resources on a server, such as is the subject of the present invention, logging on to the server only allows a user to then request access to a resource on the server. Checking whether a user has access-permission to a particular resource, and providing access to the resource, is the subject of the remaining discussion.

If a user logs on to server 100 for the first time, the system of the present invention assigns a unique user-token to the user and stores the user-token in user-token cache 200. User-token cache 200, stored on RAM 104 of server 100 or on another suitable storage device, is comprised of entries 201–203. There is an entry 201–203 for each user that has logged on to server 100. Each entry 201–203 in user-token cache 200 is comprised of a user-name 204, a user-token 205 and a user-password 206. For example, when User 1 first logs on to server 100, server 100 assigns a unique user-token, Token1, to User 1 and stores User 1's user-name, user-password, and user-token as entry 201 in user-token cache 200. When User 1 subsequently logs on to server 100, the system of the present invention retrieves User 1's user-token from user-token cache 200 so that User 1 will be assigned the same user-token each time User 1 logs on to server 100.

In a network such as the internet, a large portion of the users logging on to server 100 do so as an 'anonymous' user. Administrators and certain other users may have unique user names and passwords but the bulk of the users logging on are doing so to access resources made available to anonymous users on server 100. If no user-name and password is supplied by a user, server 100 assigns the user-name "Anonymous" to the user. As a result, each anonymous user, one not supplying a user-name and password upon logging on, is assigned the same user-token by the system of the present invention. In the example of FIG. 2, and the following figures, anonymous users are assigned user-token Token3. Entry 203 is the entry for user Anonymous in user-token cache 200.

User-tokens 205 are represented in textual form to simplify the description of the present invention. In a preferred embodiment of the present invention, each user-token is a unique 32 bit value assigned by the system of the present invention.

Figure 3:
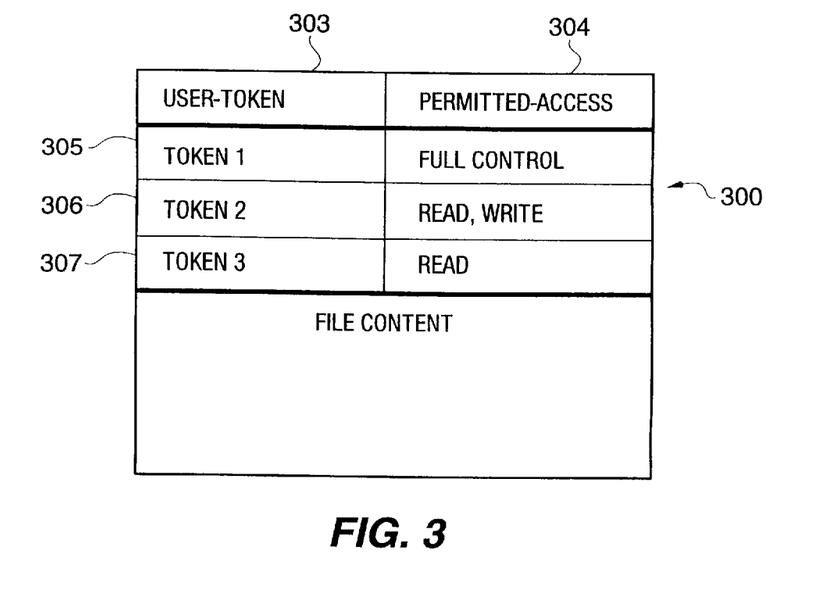
FIG. 3 depicts a file-object and associated access control list.

Access-Control Lists—FIG. 3

In a preferred embodiment of the present invention the control of access to server 100's resources is at the file level. This means that each file-object stored on server 100 has associated with it a definition, called an Access Control List (ACL), of which users have what access rights with respect to the particular file-object. Non-volatile memory 107 contains file-storage volume 109. File-storage volume 109 contains a number of file-objects 300–302 of which file-object 300 of FIG. 3 is exemplary. File-objects 301–302, discussed with respect to FIG. 4 along with file-object 300, are not shown in the figures but are of the same format as described below with respect to file-object 300.

File-object 300 is comprised of ACL 301 and file 302. File 302 is the actual, substantive content of file-object 300. ACL 301 defines the extent to which various users can access and manipulate file 302. ACL 301 of file-object 300 contains Access Control Entries (ACE) 305–307. Each ACE 305–307 is comprised of a user-token field 303 and a permitted-access field 304. ACE 305 defines the permitted access to file 302 by the user having user-token token1. The permitted access 304 for Token1 is "Full Contro" meaning user 1 can manipulate file 302 in any way possible through the operation of server 100. Likewise, the user to which Token2 is assigned as a user-token has "read/write" permission for file-object 300. Users logged in as Anonymous and assigned Token3 as a user-token are permitted only read access according to ACE 307 of access control list 301. Although only three ACEs are depicted in access control list 301 of FIG. 3, those skilled in the art will recognize that any number of ACE's could be added to access control list 301 as necessary for the needs of server 100.

Although the example of file-object 300 depicts access control at the file level of server 100, those skilled in the art will readily recognize that the methods of the present invention readily apply to systems having different levels of access control. For example, in server 100 an access control list could be associated with non-volatile memory 107 so that access to all resources on non-volatile memory 107 would be defined by a single access control list. Another example would be an access control list associated with file-storage volume 109 whereby access to all the files stored in file-storage volume 109 would be defined by a single access control list. It is also within the scope of the present invention to utilize access control lists at different levels within the same server 100 so, for example, there could be an access control list associated with non-volatile memory 107 and separate access control lists associated with some or all of the file-objects stored on non-volatile memory 107.

Figure 4:
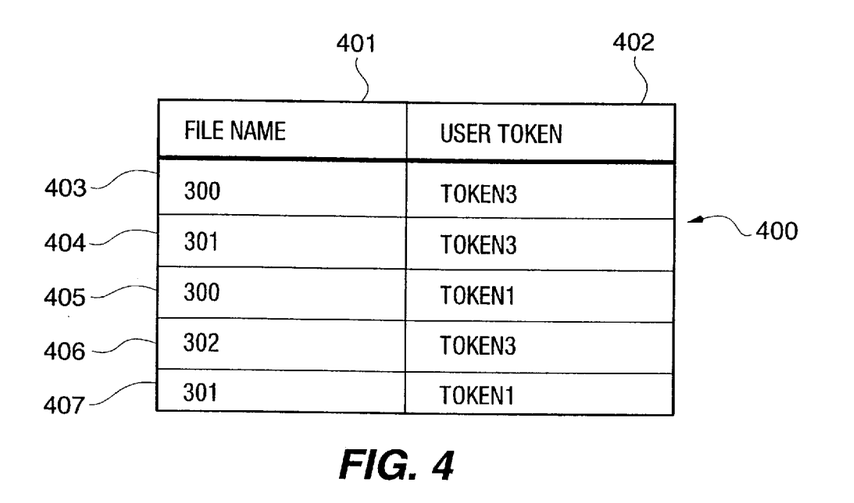
FIG. 4 depicts an access-control list according to the present invention.

Access-Cache—FIG. 4

Access-cache 400 of FIG. 4 is comprised of access-permissions 403–407 each of which is comprised of a file-name field 401 and a user-token field 402. Each access-permission 403–407 indicates that a user, identified by the user-token in user-token field 402, has permission to access, and has accessed, the file identified in the corresponding file-name field 401. Each time server 100 performs an access check for a user-token/file name combination not already existing as an access-permission in access-cache 400 for which access is permitted, server 100 enters a new access-permission in access cache 400.

In a further embodiment of the present invention, access-cache 400 only contains an access-permission for the most recent instance of a file having been accessed. For example, FIG. 4 indicates two access permissions 403 and 405 for file name 300. If access-permission 403 is the more recent of the two then it would have over-written access-permission 405 and there would be only a single access-permission for file 300 in access-cache 400. This approach is simpler to implement than the embodiment creating an access-permission each time a new user-token accesses a given file. The same advantages are achieved, however, especially when there are few users or a common user such as the anonymous user of the internet example.

Access Check System: General Operation—FIGS. 1–4

In general, when a user requests access to a file-object on non-volatile memory 107, server 100 first checks access-cache 400 to determine if there is an access-permission 401 that matches both the user-token for the requesting user and the requested file. If there is a matching access-permission in access-cache 400, the existence of which indicates that the necessary access check has already been performed, access to the requested file is granted. If there is no matching access-permission in access-cache 400, server 100 performs a full access check by opening the requested file and reading the access control list associated with the requested file. If, as a result of the access check, access is permitted, then a corresponding access-permission is appended to access-cache 400.

An example of User 1 requesting file-object 300 is described with respect to FIGS. 1–4. User 1, as one of clients 1–N, attempts to log on to server 100 by supplying a user-name and a password to server 100 over network 102. The user-name and password supplied by User 1 are recognized by server 100 and User 1 is therefore allowed to log on to Server 100. Server 100 first checks user-token cache 200 of FIG. 2 for a user-token matching User 1's user-name and password. Entry 201 of user-token cache 200 matches User 1's user-name and therefore server 100 retrieves Token1 from user-token cache 200 to use as the user-token for User 1.

User 1 requests to read file 300. Server 100 checks access-cache 400 for an access-permission matching the current request. Access-permission 403 relates to file-object 300 but the user-token for access-permission 403 doesn't match User 1's user-token. Access-permission 405 is comprised of a file-name field containing the name of the requested file and a user-token field containing User 1's user-token. Access-permission 405 is therefore returned by the system to server 100 signifying that User 1 has been granted permission to read file-object 300. Server 100 then allows access to file 300 by User 1.

A further example of the general operation of the methods of the present invention is described with respect to User 2 requesting to read file-object 300. User 2, as one of clients 1–N, attempts to log onto server 100 by supplying a user-name and a password to server 100 over network 102. The user-name and password supplied by User 2 are recognized by Server 100 and User 2 is therefore allowed to log on to Server 100. Server 100 first checks user-token cache 200 of FIG. 2 for a user-token matching User 2's user-name. Entry 202 of user-token cache 200 matches User 2's user-name and therefore server 100 retrieves Token2 from user-token cache 200 as the user-token for User 2.

User 2, now logged on to server 100, places a request to read file-object 300. Server 100 checks access-cache 400 for an access-permission matching the current request. Access-permissions 403 and 405 each have file-object 300 in the file-name field 401 but neither access-permission 403 or 405 have a user-token field 402 that matches User 2's user-token. This means that User 2 has not previously read file 300 and the system must perform a full, file open, access check. Referring to FIG. 3, file-object 300 is opened and access control list 301 is read to determine the access-permission granted to User 2. ACE 306 defines User 2's granted access to file-object 300. Permitted-access field 304 of ACE 306 indicates that User 2 has read/write permission for file 300. Access for reading file-object 300 is therefore provided to User 2. Once the file-open access check is completed, an appropriate access-permission (not shown) is added to access-cache 400 so that a file-open access check will not need to be performed the next time User 2 requests file-object 300.

In the above examples of an embodiment of the present invention, access-permissions are only generated and utilized with respect to Read access requests. In a further embodiment of the present invention, access-cache 400 also includes information about the level of access associated with a previous resource request. In this embodiment, if a user having a certain user-token has previously read a certain file but is currently asking to write the file, a new access-permission reflecting the write permission is generated, if appropriate, and added to the access-cache.

Access Check System: Security Maintenance— FIGS. 2–4

When changes are made to a file-object, the methods of the present invention operate to ensure that access-cache 400 is updated so that unintended security holes are avoided. Likewise, if user-token cache 200 is modified, the methods of the present invention operate to ensure that access-cache 400 is updated appropriately.

When a file-object is modified, the system of the present invention flushes all access-permissions in access-cache 400 containing the file name of the modified file-object. This means that on the next request for the file-object, the system will be required to perform a full access check by opening the requested file-object to read the associated access control list thereby ensuring that any changes made to the access control list are not over-looked. Maintaining the security of the system in such a way is necessary or access-cache 400 could effectively circumvent any changes made to the access control lists.

In a further embodiment of the present invention, access-cache 400 is flushed of all occurrences of the file name of the modified file-object only when it is the access control list of the file-object that has been modified. Otherwise, if changes have been made to the file-object that do not effect the access control list then the corresponding entries in access-cache 400 are left untouched.

If a user's access to the resources of server 100 is modified or eliminated, then the corresponding entry in the user-token cache is removed. When a user-token is removed from user-token cache 200, the system of the present invention flushes all access-permissions in access-cache 400 containing the removed user-token. This eliminates the possibility of access-cache 400 allowing access to resources even after a user's access to server 100 has been modified or eliminated.

Access Check System: Efficiency
Optimization—FIGS. 2–4

An advantage of the present invention for access checks is the elimination of the need to open access control lists each time a resource request is processed if a similar request has already been processed. A way to maximize this advantage is to group or cluster users to reduce the number of different user-tokens. For example, a number of users within the same work-group might all be granted the same level of access to the files on server 100. A filter can be applied by the system of the present invention so that when a member of the group logs on to server 100, they are assigned the user-token designated for that group rather than a user-token unique to the individual user. In this fashion, fewer user-tokens are generated and therefore fewer access checks requiring the reading of access control lists are performed.

A variation of this advantage is to operate the system of the present invention so that a group or class of users log on to server 100 using the same user-name and password and as a result are assigned the same user-token upon logging on. For example, user-name "Anonymous" is assigned to user's placing requests over the internet for resources on server 100. All such users are assigned the same user-token, Token3 in the example of FIGS. 2–4, and the number of access checks performed by server 100 is significantly reduced. Another example is a server that maps each user that logs on to one of several different user names. Each user name to which a logged-on user is mapped might correspond to a work-group, a level of security access, or any other grouping deemed appropriate by the system administrator.

Access Check System: Detailed Operation—FIG. 5

Figure 5:
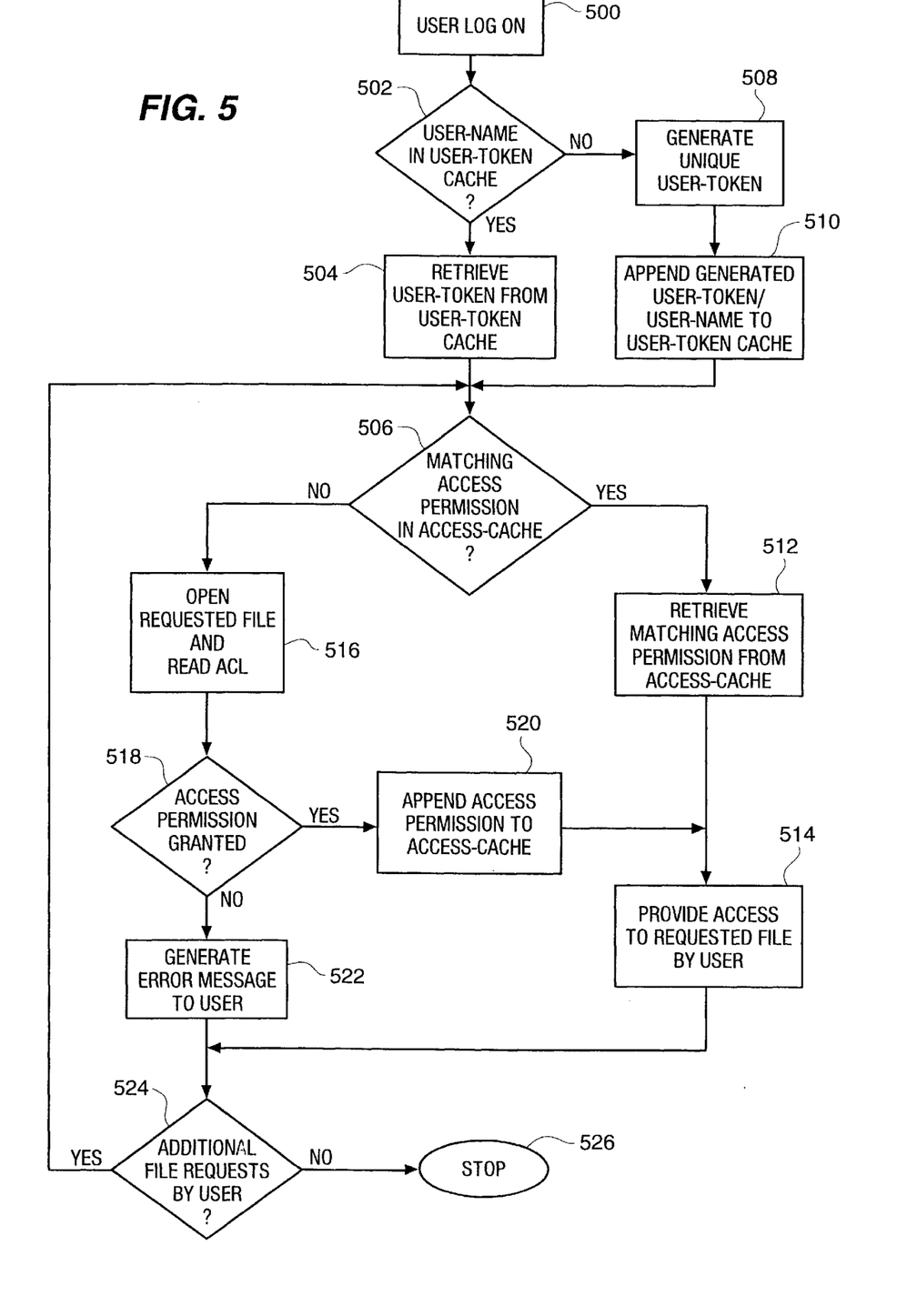
FIGS. 5–6 illustrate access checking according to the present invention in flow diagram form.
Figure 6:
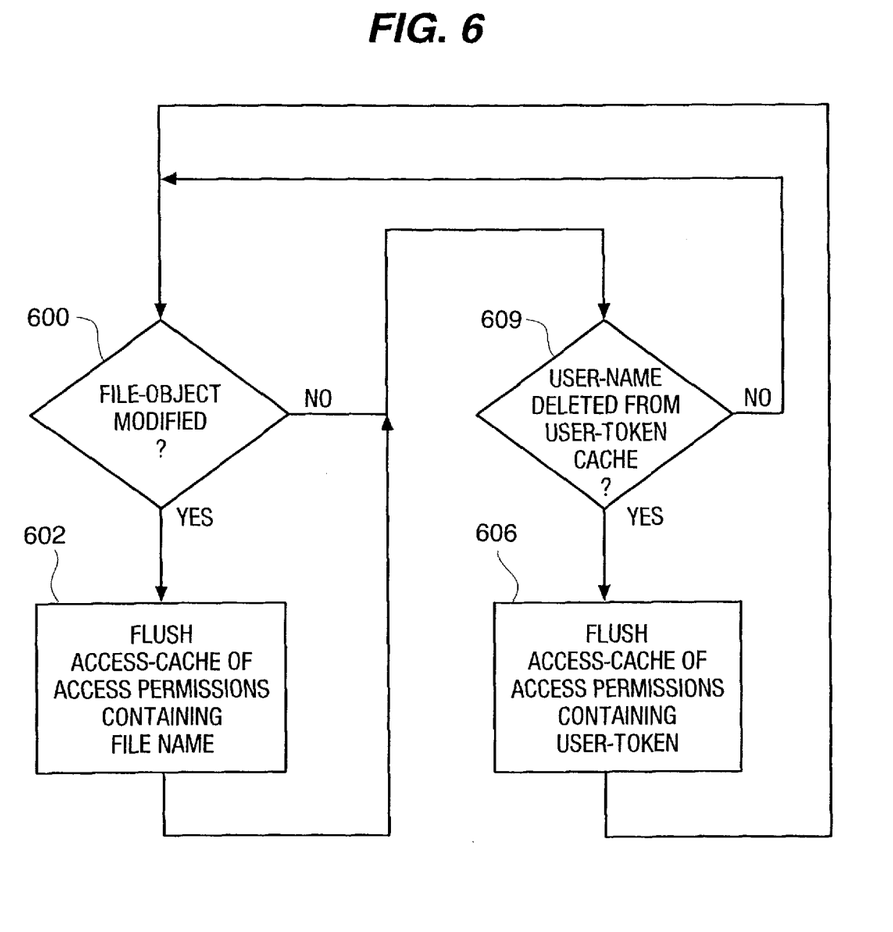

The flow-charts of FIGS. 5–6 depict the operation of the methods of the present invention in greater detail. FIG. 5 depicts the operation of the access-cache system while FIG. 6 depicts the operational steps of the security maintenance features of the present invention.

Step 500 represents the process of a user logging on to server 100. As described above with respect to FIG. 2, a user optionally supplies a user-name and a password and is allowed to log on to server 100 if server 100 recognizes the user-name and password. Once a user has logged on, processing continues to decision block 502.

Decision block 502 operates to determine if the user-name of the user exists in an entry in user-token cache 200. If the relevant user-name exists in user-token cache 200 then processing continues to step 504, otherwise processing continues to step 508. Step 504 operates to retrieve from user-token cache 200 the user-token associated with the relevant user-name. All file requests by the user are then identified by server 100 with the user-token retrieved from user-token cache 200. Step 508 operates to generate a unique user-token for the user if, in decision block 502, it was determined that a user-token had not yet been assigned to the user. Then, in step 510, the generated user-token is appended to user-token cache 200 so that the next time the user logs on to server 100, the assigned user-token will be available in user-token cache 200. After both step 504 and step 510 processing continues with decision block 506.

Decision block 506 operates to determine if access-cache 400 contains an access-permission that matches the request made by the user. As noted above, a matching access-permission is one that contains the relevant user-token and the requested file-name. If a matching access-permission is identified in access-cache 400 then processing continues to step 512 otherwise processing continues to step 516.

Step 512 operates to retrieve the matching access-permission from access-cache 400. Server 100 then, in step 514, provides access to the requested file as requested by the user. In step 516, since a matching access-permission was not found in access-cache 400, a full access check is begun by opening the requested file-object and reading the associated access control list. Processing then continues to decision block 518.

Decision block 518 operates to determine if the access control list of the requested file-object permits the access requested by the user. If the user is permitted the requested access according to the access control list then processing continues with step 520 otherwise processing continues to step 522. During step 520, a new access-permission is generated for the current user and requested file and the new access-permission is appended to the contents of access-cache 400. Processing then continues to step 514 where the user is provided access to the requested file.

If, in decision block 518, it is determined that the user does not have the requested access-permission, then processing continues to step 522. In step 522 an error message is generated and communicated to the user to notify the user of the negative result of the access check. After a file request has been processed, either concluding with providing the requested access as in step 514 or by notifying the user of the users lack of access as in step 522, processing continues to step 524.

Decision block 524 operates to determine if there are additional file requests by the user that have not been processed. For example, in the case of server 100 operating as an internet server, it often receives multiple file requests at once from a single user. Each of these file requests is processed in the same fashion as described above. If the operation of decision block 524 determines that there are further file requests by the same user to be processed then processing returns to decision block 506 otherwise processing continues to step 526 where processing of the user's file requests is concluded.

Access Check System: Detailed Operation—FIG. 6

The processing steps 600–606 depicted in FIG. 6 are repeated on a regular, periodic basis to ensure the security of the resources of server 100. Decision block 600 operates to determine if a file-object has been modified. If a file-object has been modified, processing continues to step 602 otherwise processing continues to step 604.

In step 602, access-cache 400 is flushed of all access-permissions containing the file-name of the modified file. This operation ensures that any changes to a file's access control list will not be over-looked as a result of the operation of the access check system of the present invention. Processing then continues to decision block 604.

Decision block 604 operates to determine if a user-token has been deleted from the user-token cache. If a user's level of access to server 100 is modified or eliminated, the user-token associated with the user is removed from the user-token cache by the operation of server 100. This occurrence is identified by the operation of decision block 604 and processing accordingly proceeds to step 606. In step 606, access-cache 400 is flushed of all access-permissions containing the deleted user-token. Processing then continues to decision block 600 where the security steps of 600–606 are again initiated.

Steps 600–606 ensure that the speed and efficiency advantages of the access check system of the present invention do not result in security holes. The increased speed of the present invention is thereby implemented only when, from a security standpoint, it is safe to do so.

SUMMARY

The access check system of the present invention includes a method and apparatus for efficiently accomplishing access checks for requested resources rather than performing a full, file-open, access check each time a user requests a resource. Although specific embodiments are disclosed herein, it is expected that persons skilled in the art can and will design alternative header generation systems that are within the scope of the following claims either literally or under the Doctrine of Equivalents.

We claim:

1. A machine-readable program storage device, embodying instructions executable by a computer to perform method steps for providing access to a plurality of resources in a file system to a plurality of users, where access to said resources is controlled by said network server and each of said plurality of users send requests to a network server for permission to access at least one of said plurality of resources, said method comprising:

first step of receiving a first resource request by said network server from a requesting user that is among said plurality of users, wherein said requesting user requests access to a requested resource from among said plurality of resources absent any authentication-processing of said resource request by said requesting user;

determining by said network server that said requesting user has permission to access said requested resource based only on a user-name of said requesting user;

generating an access-permission for said requesting user in response to successfully determining that said requesting user has permission to access said requested resource;

storing said access-permission in an access-cache accessible to said network server, wherein said access-cache contains n>2 of the last access-permissions generated and absent any access-permission information stored by said requesting user;

first step of providing access to said requested resource by said requesting user in response to successfully determining that said requesting user has permission to access said requested resource;

second step of receiving a second resource request by said network server from said requesting user to access said requested resource, wherein said second resource request contains identical user identifying information as said first resource request;

retrieving said access-permission stored in said access-cache by said network server, wherein said access-permission corresponds only to said user-name of said requesting user and said step of retrieving occurs only in response to receipt of said second resource request alone absent any other identifier of said requesting user beyond said user-name, and wherein said second resource request necessitates the same access-permission as said access-permission stored in said access-cache; and second step of providing access to said requested resource by said requesting user in response to said retrieving step.

2. A method according to claim 1 wherein said determining step includes:

opening an access control list wherein said access control list includes a plurality of entries each of which defines the extent to which corresponding ones of said plurality of users have permission to access said requested resource;

searching said access control list for an entry including said user-name of said requesting user;

reading from said entry the level of access granted to said requesting user with respect to said requested resource; and indicating to said network server, in response to said reading step, that said requesting user has permission to access said requested resource.

3. A method according to claim 2 wherein said opening step includes:

locating said requested resource where said requested resource contains said access control list;

opening said requested resource;

searching said access control list for one of said plurality of entries that includes said name of said requesting user;

reading from said entry the level of access granted to said requesting user with respect to said requested resource; and indicating to said network server, in response to said reading step, that said requesting user has permission to access said requested resource.

4. A method according to claim 3 wherein said step of opening said requested resource comprises:

opening a disk wherein said requested resource is said disk.

5. A method according to claim 3 wherein said step of opening said requested resource comprises:

opening a file wherein said requested resource is said file.

6. A method according to claim 1 wherein said step of receiving a first resource request includes:

identifying said name of said requesting user sending said first resource request;

selecting a user-token from a user token-cache wherein said user-token is associated with said user-name of said requesting user; and utilizing said user-token with respect to processing said first resource request from said requesting user.

7. A method according to claim 6 wherein said determining step includes:

opening an access control list wherein said access control list includes multiple entries each one of which defines the extent to which different ones of said plurality of users have permission to access said requested resource;

searching said access control list for an entry including said user-token;

reading from said entry the level of access granted to said user-token with respect to said requested resource; and indicating to said network server, in response to said reading step, that said requesting user having said user-token has permission to access said requested resource.

8. A method according to claim 7 wherein said opening step includes:

locating said requested resource where said requested resource contains said access control list;

opening said requested resource;

searching said access control list for an entry including said user-token;

reading from said entry the level of access granted to said user-token with respect to said requested resource; and indicating to said network server, in response to said reading step, that said requesting user having said user-token has permission to access said requested resource.

9. A method according to claim 2 wherein said step of generating said access-permission includes:

combining said name of said requested resource and said user-name of said requesting user to form said access-permission in response to said step of indicating that said requesting user has permission to access said requested resource.

10. A method according to claim 2 wherein said requested resource is a file having a file name, said step of generating said access-permission includes:

combining said file name and said user-name of said requesting user to form said access-permission in response to said step of indicating that said requesting user has permission to access said requested resource.

11. A method according to claim 7 wherein said step of generating said access-permission includes:

combining said name of said requested resource and said user-token to form said access-permission in response to said step of indicating that said requesting user having said user-token has permission to access said requested resource.

12. A method according to claim 7 wherein said requested resource is a file having a file name, said step of generating said access-permission includes:

combining said file name and said user-token to form said access-permission in response to said step of indicating that said requesting user has permission to access said requested resource.

13. A method according to claim 1 wherein said generating step includes:

combining a first set of data identifying said requesting user with a second set of data identifying a location of said requested resource to form said access-permission.

14. A method according to claim 1 wherein said retrieving step includes:

determining said user-name of said second one of said plurality of users;

determining a resource-name of said requested resource; and selecting from said access cache a one of said n access-permissions wherein said selected access-permission contains said user-name and said resource name.

15. A method according to claim 14 wherein said step of determining said user-name includes:

searching a user-token cache for a user-token associated with said requesting user; and selecting said user-token in response to said searching step.

16. A method according to claim 15 wherein said step of selecting one of said n access-permissions from said access-cache includes:

selecting from said access cache a one of said n access-permissions wherein said selected access-permission contains said user-name and said resource name.

17. A method according to claim 1 wherein said first step of retrieving step includes:

searching a user-token cache for a user-token associated with a first requesting user; and selecting said user-token in response to said searching step, identifying a file-name wherein said file-name identifies said requested resource; and selecting from said access cache a one of said n access-permissions wherein said selected access-permission contains said user-token and said resource name.

18. A method according to claim 1 further comprising the steps of:

tracking security changes made to said network server; and updating, in response to said tracking step, said access-cache to ensure the security of said plurality of resources stored on said network server.

19. A method according to claim 18 wherein said tracking step includes:

tracking changes made to a user-token cache wherein said user-token cache contains a unique user-token for each of said plurality of users that has logged on to said network server.

20. A method according to claim 19 wherein said updating step includes:

removing from said access-cache all said access-permissions containing said user-token that has been changed.

21. A method according to claim 18 wherein said tracking step includes:

tracking changes made to said plurality of resources in said file system by storing a resource name of one of said plurality of resources that has been changed.

22. A method according to claim 21 wherein said updating step includes:

removing from said access-cache all said access-permissions containing a name of one of said plurality of resources that has changed.

23. A method operational in a network server for providing access to at least one of a plurality of resources in a file system where access to said at least one of said plurality of resources is controlled by said network server and each of a plurality of users send requests to said network server for permission to access said resources, said method comprising:

- first step of receiving a first resource request by said network server from a requesting user that is among said plurality of users, wherein said requesting user requests access to a requested one of said plurality of resources;
- determining, based only on a publicly known user-name of said requesting user in response to said first resource request, that said requesting user has permission to access said requested one of said plurality of resources;
- generating, in response to successfully determining that said requesting user has permission to access said requested resource, an access-permission;
- storing said access-permission in an access-cache accessible to said network server wherein said access cache contains the last n access-permissions generated, where n is a positive integer greater than 2;
- first step of providing access to said requested resource by said requesting user in response to successfully determining that said requesting user has permission to access said requested resource;
- second step of receiving a second resource request from said requesting user to access said requested resource;
- retrieving one of said last n access-permissions stored in said access-cache by said network server based only on said publicly known user-name of said requesting user, in response to receipt of said second resource request wherein said second resource request by said requesting user necessitates the same access-permission as said access-permission stored in said access-cache; and
- second step of providing access to said requested resource for said requesting user in response to said retrieving step.

24. An apparatus operational in a network server for providing access to at least one of a plurality of resources in a file system where access to said at least one of a plurality of resources is controlled by said network server and each of a plurality of users send requests to said network server for permission to access said at least one of a plurality of resources, said apparatus comprising:

- first means for receiving a first resource request by said network server from a requesting user that is among said plurality of users, wherein said requesting user requests access to a requested resource from among said plurality of resources absent any authentication-processing of said resource request by said requesting user;
- means for determining by said network server that said requesting user has permission to access said requested resource based only on a publicly known user-name of said requesting user;
- means for generating an access-permission for said requesting user in response to successfully determining that said requesting user has permission to access said requested resource;
- means for storing said access-permission in an access-cache accessible only to said network server, wherein said access cache contains n>2 of the last access-permissions generated;
- first means for providing access to said requested resource by said requesting user in response to successfully determining that said requesting user has permission to access said requested resource;
- second means for receiving a second resource request from said requesting user to access said requested resource, wherein said second resource request contains identical user identifying information as said first resource request;
- means for retrieving said access-permission stored in said access-ache by said network server, wherein said access-permission corresponds only to said user-name of said requesting user and said means for retrieving occurs only in response to receipt of said second resource request alone absent any other identifier of said requesting user beyond said user-name, and wherein said second resource request necessitates the same access-permission as said access-permission stored in said access-cache; and
- second means for providing access to said requested resource by said requesting user in response to said retrieving step.

* * * * *